No. 819,746. PATENTED MAY 8, 1906.
A. A. FORBES.
MACHINE FOR MAKING ARTIFICIAL STONE.
APPLICATION FILED DEC. 19, 1904.
2 SHEETS—SHEET 1.
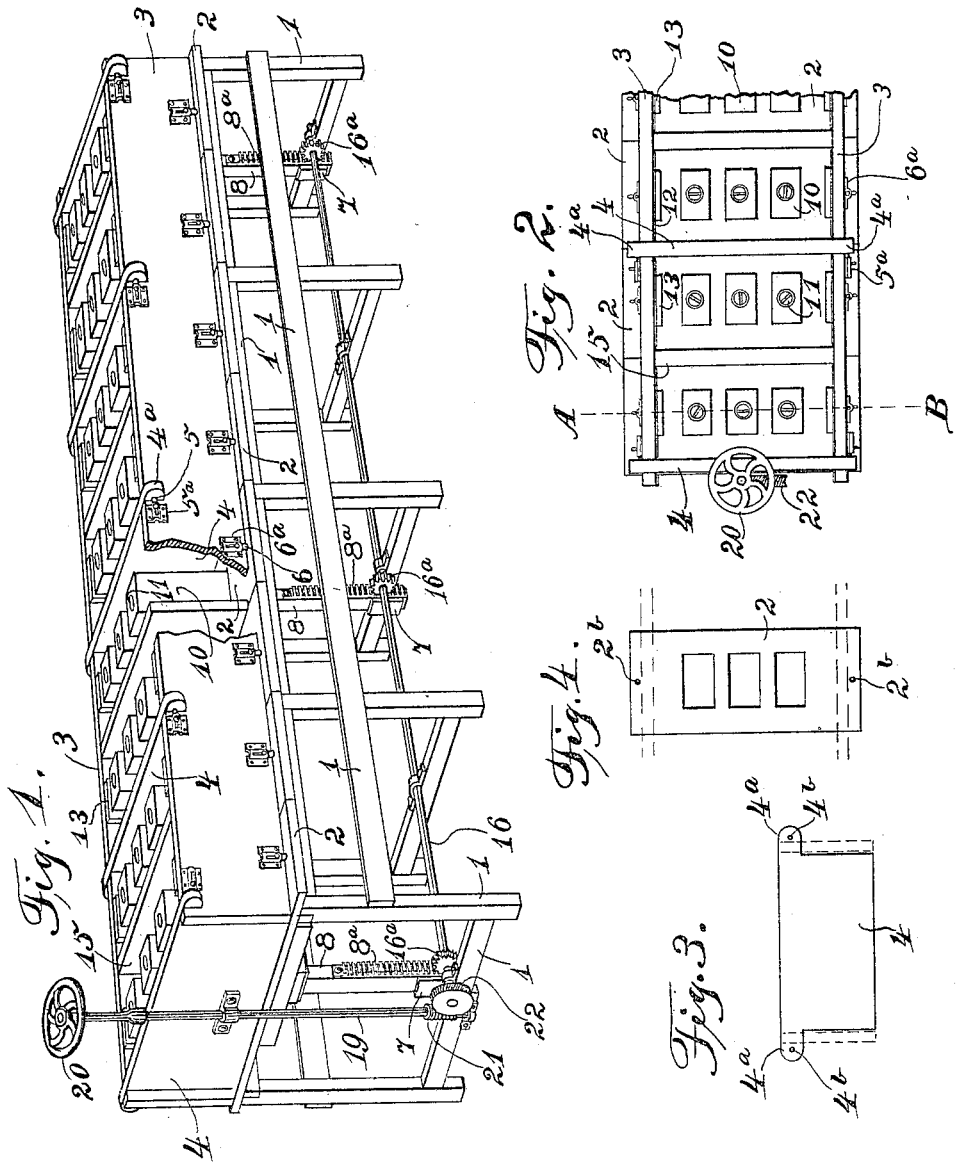
WITNESSES:
Welling G. Blewett
Charlotte E. Sullivan
INVENTOR.
Alexander A. Forbes
BY James T. Watson
his ATTORNEY.

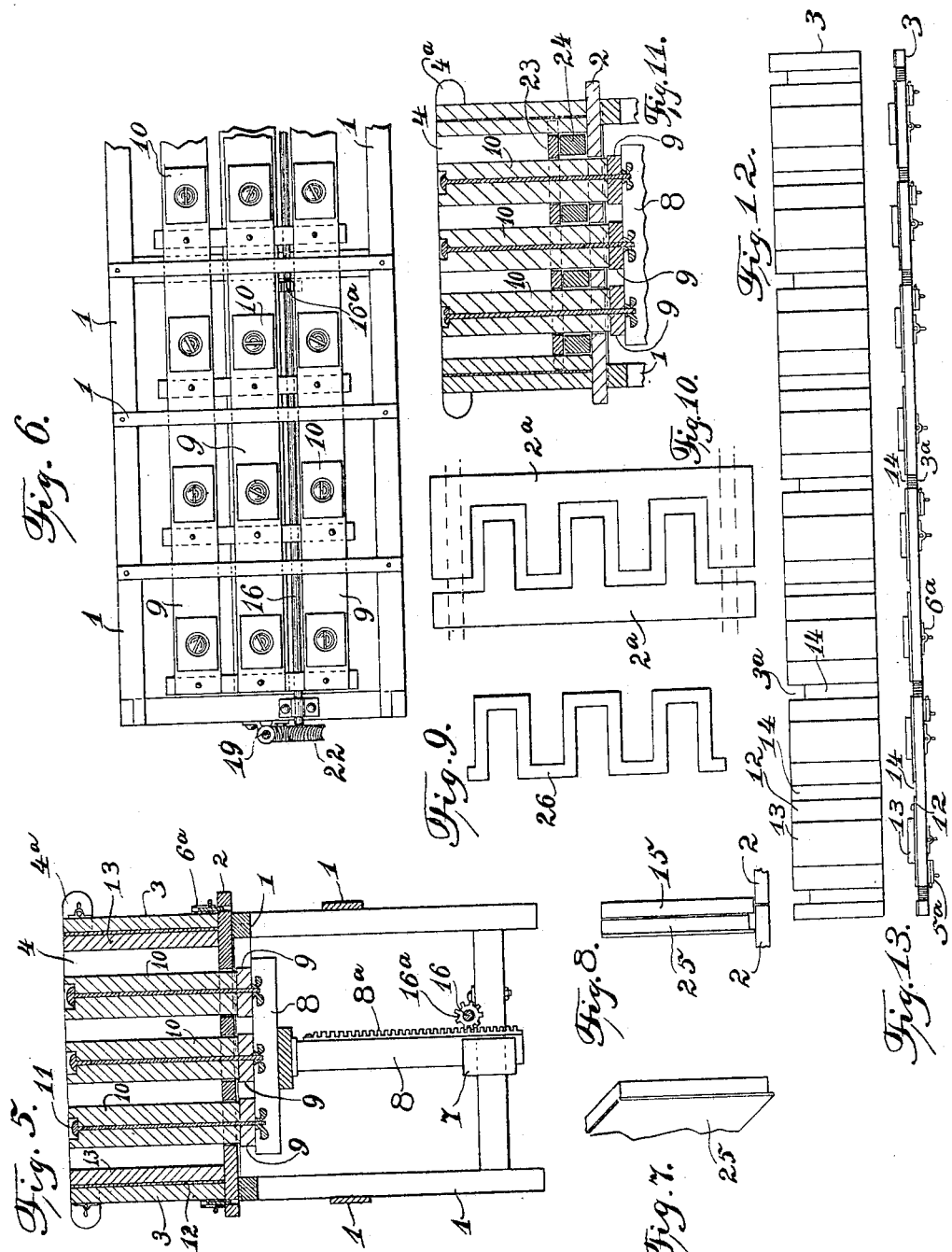

UNITED STATES PATENT OFFICE.

ALEXANDER A. FORBES, OF DULUTH, MINNESOTA.

MACHINE FOR MAKING ARTIFICIAL STONE.

No. 819,746.  Specification of Letters Patent.  Patented May 8, 1906.

Application filed December 19, 1904. Serial No. 237,373.

*To all whom it may concern:*

Be it known that I, ALEXANDER A. FORBES, a citizen of the United States, residing at Duluth, in the county of St. Louis and State of Minnesota, have invented certain new and useful Improvements in Machines for Making Artificial Stone; and I do hereby declare the following to be a full, clear, and exact description of the invention, such as will enable others skilled in the art to which it appertains to make and use the same.

My invention relates to machines for making artificial stones, and has for its object the provision of a simply-constructed machine wherein said stones may be molded and from which they may be readily removed.

With these and other objects in view it consists of a frame, platens laid thereon, vertically-movable core-blocks extending loosely through said platens, means mounted on said frame for moving said core-blocks, removable end and side walls erected above said platens, and removable partition-walls erected above said platens and removably secured to or by said side walls.

It also consists of certain other constructions, combinations, and arrangements of parts, as will be hereinafter described and claimed.

In the accompanying drawings, Figure 1 is a perspective view of my said invention, partly broken away. Fig. 2 is a plan view of approximately one-half of a machine embodying my said invention, the remaining approximately similar half being broken away. Fig. 3 is a side elevation of a partition-wall forming part of my said invention. Fig. 4 is a plan view of one of the platens forming part of said invention. Fig. 5 is an enlarged transverse vertical sectional view of said invention on the line A B of Fig. 2. Fig. 6 is an enlarged plan view of said machine, partly broken away, and with the platens and side walls omitted. Fig. 7 is an enlarged perspective view, partly broken away, of a space-reducing plate. Fig. 8 is an enlarged end view of portions of two adjoining platens, showing a partition-wall and a space-reducing plate mounted thereon. Fig. 9 is an enlarged plan view of a modified form of core-block within the scope of my said invention. Fig. 10 is an enlarged plan view of a modified form of a platen formed of two parts spaced apart and within the scope of my said invention. Fig. 11 is an enlarged vertical transverse section of a portion of said machine on the said line A B of Fig. 2, but showing a removable false bottom laid upon said platen, whereby the depth of the mold is reduced. Fig. 12 is an enlarged inside elevation of one of the side walls of said machine. Fig. 13 is an enlarged plan or top edge view of said side wall.

In the drawings, 1 is a supporting-frame upon which are laid the platens 2 or the modified platens $2^a$ or other suitable platens, as desired. Upon said platens are removably erected the side walls 3 of a mold-box. Extending from one to the other of said side walls are end walls and partition-walls 4, provided with extensions $4^a$, adapted to fit into notches $3^a$, formed in the upper edges of said side walls, and to extend a short distance outwardly beyond said side walls. The outer ends of said extensions are provided in their sides with recesses or apertures $4^b$, adapted to receive bolts 5, mounted in bearings $5^a$, secured to the outer faces of said side walls; but any suitable form of temporary securing means may within the scope of my invention be used to secure said side walls and said partition-walls in position. Other sliding bolts 6, mounted in bearings $6^a$, secured to said side walls, are adapted in operation to project into apertures $2^b$ in said platens. Erected in guides 7, secured to said frame, are vertically-sliding T-shaped standards 8, upon the upper ends of which is secured a bed comprising the sills 9. Upon said sills are erected and secured in any suitable manner core-blocks 10, which blocks are preferably vertically apertured to receive corresponding bolts 11, adapted to project vertically therethrough and through corresponding apertures in said sills. Upon the inner faces of said side walls are preferably secured plates 12 and 13, which plates 12 are preferably so spaced as to form the channels 14, adapted to receive and support the ends of modified partition-walls 15 or portions of the ends of said partition-walls 4; but said partition-walls may, if preferred, be all constructed as shown in Fig. 3. The plates 13 serve to make indents in the ends of the stone molded by said machine, and thus operate as modified core-blocks. Journaled in suitable bearings on said frame is a shaft 16, upon which are rigidly secured pinions $16^a$, adapted to engage corresponding vertical racks $8^a$, secured to said standards 8. At one end of said machine is preferably mounted in suitable bearings a vertical shaft 19, provided at its upper end with a hand-wheel 20 or equivalent device for turning it and provided at its lower end with a worm 21, adapted to engage a worm-wheel 22, rigidly secured to the adjoining end of said shaft 14. Thus by operating said hand-wheel in one direction said core-blocks will rise into operative position through said platens and by operating said hand-wheel in the opposite direction said core-blocks will be withdrawn from the stone which is molded around them. If it is desired to contract the depth of the spaces within which the stone is to be molded, a false bottom comprising platens 23 of smaller area than said platens 2 may be inserted between said side walls above said platens 2. To still further contract said depth, blocks or bars 24 may be inserted between said platens 2 and 23. To contract the width of the mold-spaces, the plates 25 may be positioned against the faces of the usual partition plates or walls.

By using the core-block 26 (shown in Fig. 9) and the platen shown in Fig. 10, each compartment of the mold will furnish two stones adapted to loosely mesh with each other in such manner that a staggered continuous air-space will exist between them, whereas in using the platen shown in Fig. 4 and the core-blocks shown in Fig. 2, each compartment of the mold will furnish a single stone with divided air-spaces formed therein.

In operation, the sides being erected and the platens and partitions being in position and properly secured and the core-blocks raised, the stone-making composition is filled into the several compartments and sufficiently tamped down. After the composition is sufficiently set, the wheel 20 is operated to withdraw said core-blocks downwardly. The bolts 5 and 6 are then retracted and the side walls removed. The partitions are then removed and the platens are lifted out with the stones on them, which are laid away to dry. If it be desired to have the machine in a low horizontal plane, it may be constructed with short legs and erected over a suitable pit, into which pit the lower ends of the standards 8 may descend when removing the core-blocks.

While I have described certain details of my construction, it is obvious that modified forms of parts or equivalents, especially in the means of fastening the parts together, may be used within the scope and spirit of my said invention, and I do not, therefore, desire to be limited to the exact construction shown.

Having now described my invention, what I claim, and desire to secure by Letters Patent, is—

1. In a machine of the class set forth, the combination of a supporting-frame, a plurality of platens resting upon said frame, side walls erected on said platens having notches in their upper edges and projections on their inner faces forming indents in the molded blocks and vertical channels, end and partition walls resting in said channels and extending from the one to the other of said side walls and having extensions beyond said side walls adapted to fit in said notches, bolts secured to the outer faces of said side walls and adapted to engage said extensions and platens, a bed below said platens, a plurality of core-blocks secured to said bed, a plurality of standards on the upper ends of which said bed is secured, racks on said standards, a shaft, a plurality of pinions on said shaft to engage said racks, and means for turning said shaft.

2. In a machine of the class set forth, the combination of a supporting-frame, a plurality of platens resting upon said frame, side walls erected on said platens having notches in their upper edges, end and partition walls extending from the one to the other of said side walls and having extensions beyond said side walls adapted to fit in said notches, means on said side walls for engaging said extensions and platens to hold the parts together, a bed below said platens, a plurality of core-blocks on said bed, a plurality of standards on the upper ends of which said bed is secured, racks on said standards, a shaft, a plurality of extensions on said shaft to engage said racks, means for turning said shaft, and means for contracting the depth and width of mold-spaces within the walls of the molds.

3. In a machine of the class set forth, the combination of a supporting-frame having side walls and end and partition walls extending from the one to the other of said side walls, said side walls having notches in their upper edges and said end and partition walls having extensions beyond said side walls adapted to fit in said notches, a bed, a plurality of standards on the upper ends of which said bed is secured, racks on said standards, a shaft, a plurality of pinions on said shaft to engage said racks, means for turning said shaft, indented platens on said support and below said walls, said platens loosely meshing with each other so as to leave a zigzag space between them, and a removable zigzag core conforming with the zigzag course between said platens.

In testimony whereof I hereunto affix my signature in presence of two witnesses.

ALEXANDER A. FORBES.

Witnesses:
JAMES T. WATSON,
WELLINGTON M. BLEWETT.